Patented Jan. 4, 1944

2,338,174

UNITED STATES PATENT OFFICE

2,338,174

TREATMENT OF DRILLING MUD

Allen D. Garrison, Houston, Tex., assignor, by mesne assignments, to The Texas Company, New York, N. Y., a corporation of Delaware Application July 1, 1939, Serial No. 282,445

1 Claim. (Cl. 252—8.5)

This invention relates to the treating and conditioning of drilling fluids employed in the drilling of wells, and more particularly to the conditioning and reclamation of drilling muds which are circulated into and out of the well during the drilling operation, such as in rotary drilling.

A principal object of this invention is to provide a method of conditioning a drilling fluid of this character which is adapted to assist in maintaining the viscosity and thixotropic properties and other desirable characteristics of the drilling fluid during the progress of drilling and repeated recirculation of the drilling fluid into and out of the well.

Another object of the invention is to provide a method for the reclamation of a cement-cut drilling fluid which has become contaminated with cement cuttings by drilling through a cemented portion of the well with the circulation of the drilling fluid, so as to recondition the drilling fluid and improve its properties for repeated recirculation during the continuance of the operation.

Still another object of the invention is to provide improved apparatus for the conditioning and reclamation of drilling fluids of this character and for their recirculation during the progress of drilling.

Other objects and advantages of the invention will be apparent from the following description when taken in connection with the annexed drawing and the appended claim.

Drilling fluids or muds are almost universally used in the drilling of wells employed for tapping underground collections of oil, gases, brines and water. These fluids fulfill various functions, the most important of which are to assist in the removal of cuttings from the well, to seal off gas pockets which may be encountered at various levels, and to lubricate the drilling tools and the drill pipes which carry the drill tools. Such drilling fluids are generally circulated down through the hollow drill stem to the locus of drilling to lubricate the rotary cutting tool, and there pick up in suspension the cuttings, which suspension is returned through the annular passage between the hollow drill stem and the well casing to the head of the well. The drilling fluid with suspended cuttings is then discharged through suitable screens which remove the coarser particles into a flow passage or mud ditch which leads to a settling pit, where the cuttings are allowed to settle out of the drilling fluid; and the settled drilling fluid is then returned for recirculation through the well.

The deterioration of a drilling mud from certain desired initial viscosity, weight, and other specifications may be occasioned by the tendency of certain types of shales and clays encountered during the drilling operation to become dispersed in the drilling fluid and to become deflocculated therein to colloidal sizes, such that they will not settle out in the settling pit. I have discovered that the mechanical agitation of the fluid by the pumps, drill stem and bit definitely contribute to the dispersion of certain shales and clays when chemical conditions are favorable to this phenomenon. This effect in the drilling fluid is exactly the same as would be obtained by the addition of highly colloidal clays, such as bentonite, which, when added to excess, cause a marked thickening or viscosity increase such as to interfere with the proper pumping, circulation and settling properties of the drilling mud. Various methods of viscosity reduction by the addition of chemicals have been resorted to for control of the mud conditions; but ultimately so high a concentration of clay develops in the fluid that it becomes impossible to reduce the viscosity by further addition of chemical, and it is then necessary to dilute the suspension with water. This involves the addition of more weighting material to maintain the desired density or weight of the drilling fluid.

It has been found that certain shales and clays representative of those that must be penetrated during drilling, are deflocculated and accumulated in the drilling fluid much more rapidly when the pH of the drilling fluid is increased above about 8.5. The higher the pH above this limiting value the more rapid is this undesirable deflocculation and accumulation of clay in the drilling fluid. Chemicals heretofore used for reduction in viscosity of the drilling fluid have almost invariably been such as to raise the pH of the fluid above this limiting value. Consequently, such chemical treatment is not the ultimate answer, because the resulting higher pH value of the drilling fluid causes upon further drilling accumulation of deflocculated shale particles in the mud at a more rapid rate, with resultant objectionable rise in viscosity.

I have discovered that this objection may be overcome and the accumulation of undesirable colloidal clay or shale particles in the drilling mud minimized during the progress of drilling by treating the drilling fluid during its circulation with carbon dioxide gas, or with a gas containing carbon dioxide, so as to maintain the drilling fluid at a pH value below about 8.5, and into the flowing mud stream by the aspirator effect of the mud gun 22.

By way of example of the effectiveness of the present invention in conditioning a drilling mud, this method of drilling was applied to a cement contaminated mud while drilling through sixty feet of a cement plug in a well in the West Columbia field of Texas. A flue gas containing about 8% carbon dioxide was violently aspirated into the mud stream of the cement-cut mud which dropped from the flow line into the ditch in such a viscous condition that it was impossible to obtain a funnel viscosity. When the flue gases were violently mixed with this mud, the gel was converted to a fluid that then flowed in the ditch.

In another treatment, the aspirator mud gun was operated for a period of five hours on a recirculating mud weighing 9.4 pounds per gallon and having an initial pH of 8.6, utilizing flue gases containing about 8% carbon dioxide, with the result that the pH of the recirculating mud was reduced to a maintained value of about 7.6 without undesirably affecting any of the other properties of the recirculating mud.

In the case where insufficient carbon dioxide may be present in the flue gas to condition a mud to the desired extent, the flue gas may be fortified with additional carbon dioxide from any other suitable source, or a gas containing a substantiaally higher proportion of carbon dioxide may be employed. For example, pipe 30 may communicate with a pressure container (not shown) of liquid carbon dioxide through a suitable pressure release valve.

Obviously many modifications and variations of the invention, as hereinbefore set forth, may be made without departing from the spirit and scope thereof, and therefore only such limitations should be imposed as are indicated in the appended claim.

I claim:

Apparatus for the circulation of a drilling fluid in the drilling of a well which comprises, in combination, means for circulating drilling fluid down the well to the locus of drilling and returning same together with suspended cuttings to the head of the well, a settling pit, a flow passage for transferring said drilling fluid with suspended cuttings from said well head to said settling pit, means for returning settled drilling fluid from said pit to the well, an aspirator gun within said flow passage, means for recycling a portion of said drilling fluid to said aspirator gun and discharging it therethrough into said flow passage to facilitate the flow of and agitate the drilling fluid mixture passing therethrough, a fire heated boiler for supplying power in connection with the drilling operation and having a stack for discharge of flue gases, and a valve controlled connection between said stack and the suction side of said aspirator gun for withdrawing flue gas from said stack and discharging it into the drilling fluid mixture passing through said flow passage.

ALLEN D. GARRISON.

Patented Jan. 4, 1944

2,338,187

UNITED STATES PATENT OFFICE

2,338,187

HEAT STABLE COMPOSITION CONTAINING VINYL CHLORIDE POLYMERS

John Richard Lewis, Leslie Budworth Morgan, and William McGillivray Morgan, Blackley, Manchester, England, assignors to Imperial Chemical Industries Limited, a corporation of Great Britain No Drawing. Application June 30, 1941, Serial No. 400,476. In Great Britain July 11, 1940

4 Claims. (Cl. 260—88)

The present invention relates to the production of compositions containing high polymers made from vinyl chloride and has for its object the production of compositions of the kind described which are stable to heat. By the term "high polymers" we designate polymers of high average molecular weight in contradistinction to "small polymers" such as dimers and trimers.

As is known, when vinyl chloride is so treated that it becomes polymerised, different polymers are obtained according to the conditions of polymerisation; and many interpolymerides of vinyl chloride with other polymerisable compounds have been described. These various polymers and interpolymers can all be regarded as consisting of chain-like molecules, some or all of whose structural units consist of the group

and all are to be regarded as high polymers made from vinyl chloride. Such high polymers are known to be comparatively unstable to heat, that is to say they suffer partial decomposition and develop undesirable coloration when exposed to elevated temperatures. It is an object of the present invention to provide high polymers made from vinyl chloride which shall be substantially free from this heat instability.

According to our invention heat-stable compositions contain a high polymer made from vinyl chloride with which is admixed a metal salt of 2:4 dihydroxyquinoline, said metal being of the class comprising the alkali metals, lead and zinc.

The compositions of the invention are not limited to those of the two ingredients, namely, the high polymer and the metallic derivative, but include also those wherein plasticisers, solvents, fillers, pigments, or other ingredients also are present.

The proportion of metallic derivative is small in relation to that of the high polymer. Preferably we use about 5% of stabiliser calculated on the combined weights of polymer and plasticiser. Larger proportions of stabiliser are unnecessary.

In carrying the invention into practical effect the metallic derivative is added to the high polymer in any convenient way and is brought into uniform admixture by stirring, kneading or milling, the manner of working being suited to the consistency of the high polymer itself, or to the order of adding plasticisers or other ingredients.

There are thus obtained compositions very stable to heat.

The compositions may, of course, be produced in such a form that they may be moulded or shaped by other means, so that solid shaped articles made from the compositions come within the scope of the invention.

In order that our invention may be fully understood, it is illustrated, but not limited by the following example, in which the parts are by weight.

Example 50 parts of a flocculose substance consisting mainly of polyvinyl chloride, made as described in example of British Specification No. 15790/39, 2.5 parts of the sodium salt of 2:4 dihydroxyquinoline and 25 parts of tricresyl phosphate are worked together on a roller mill (as used for rubber) with the rollers heated at about 110–120° C. until a sheet of homogeneous material is obtained.

When a sample of this material was heated in an oven for 14 days at 100° C. it remained rubber-like and darkened only very slightly. A sample of a similar material made without any added salt of 2:4 dihydroxyquinoline became completely black after only three days in the oven at 100° C.

In the above example the mixing was carried out in a roller mill. Other mixers may be used, for example, an internal mixer. Instead of the sodium salt of 2:4 dihydroxyquinoline there may be used the lead or zinc salts.

We claim:

1. A heat-stable composition containing a high average molecular weight polymerized vinyl chloride with which is admixed a metal salt of 2:4 dihydroxyquinoline, said metal being selected from the group consisting of the alkali metals, lead and zinc.

2. A heat-stable composition according to claim 1, in which the proportion of metal salt admixed does not exceed 5% by weight calculated on the combined weights of the high polymer and of the metal salt.

3. A heat-stable composition according to claim 1, in which the metal salt used is the sodium salt.

4. A process for the production of heat-stable compositions containing a high average molecular weight polymerized vinyl chloride which comprises incorporating with said high polymer a metal salt of 2:4 dihydroxyquinoline, said metal being selected from the group consisting of the alkali metals, lead and zinc.

JOHN RICHARD LEWIS.
LESLIE BUDWORTH MORGAN.
WILLIAM McGILLIVRAY MORGAN.